United States Patent
Koju et al.

(10) Patent No.: US 10,303,493 B2
(45) Date of Patent: May 28, 2019

(54) PERFORMANCE ACCELERATION IN MIXED-LANGUAGE APPLICATIONS

(71) Applicant: INTERNATIONAL BUSINESS MACHINES CORPORATION, Armonk, NY (US)

(72) Inventors: Toshihiko Koju, Tokyo (JP); Ying Chau R. Mak, Markham (CA); Toshio Suganuma, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 15/343,700

(22) Filed: Nov. 4, 2016

(65) Prior Publication Data

US 2018/0129517 A1 May 10, 2018

(51) Int. Cl.
*G06F 8/30* (2018.01)
*G06F 9/445* (2018.01)
*G06F 9/455* (2018.01)

(52) U.S. Cl.
CPC ...... *G06F 9/44589* (2013.01); *G06F 9/45516* (2013.01); *G06F 8/31* (2013.01)

(58) Field of Classification Search
CPC .............................. G06F 9/44589; G06F 8/31
USPC .......................................................... 717/114
See application file for complete search history.

(56) References Cited

U.S. PATENT DOCUMENTS

| | | | |
|---|---|---|---|
| 6,009,517 A * | 12/1999 | Bak ...................... | G06F 9/45504 712/245 |
| 6,851,108 B1 * | 2/2005 | Syme .................. | G06F 9/44589 717/118 |
| 7,076,557 B1 | 7/2006 | LaMacchia et al. | |
| 7,350,194 B1 * | 3/2008 | Alpern .................. | G06F 11/362 714/E11.207 |
| 8,271,999 B2 | 9/2012 | Jones et al. | |
| 8,291,381 B2 | 10/2012 | Lai et al. | |
| 8,468,507 B2 | 6/2013 | Agarwal et al. | |
| 8,566,795 B2 | 10/2013 | DeWitt, Jr. et al. | |
| 2003/0204838 A1 * | 10/2003 | Caspole .............. | G06F 11/3616 717/130 |
| 2006/0070044 A1 * | 3/2006 | Romanovski ........... | G06F 9/449 717/136 |
| 2008/0189683 A1 * | 8/2008 | Payette ..................... | G06F 8/41 717/114 |
| 2011/0167248 A1 * | 7/2011 | Gafter .................... | G06F 9/4486 712/242 |

(Continued)

OTHER PUBLICATIONS

Bradford J. Rodriguez. 1989. Stack frames in Forth. SIGFORTH Newsl. 1, 4 (Dec. 1989), 19-21. (Year: 1989).*

(Continued)

*Primary Examiner* — James D. Rutten
(74) *Attorney, Agent, or Firm* — Tutunjian & Bitetto, P.C.; Vazken Alexanian

(57) ABSTRACT

Methods and systems for cross-language program execution include setting a signature of a second programming language in a first program that is written in a first programming language. A second program that is written in the second programming language is called from the first program, such that the second program omits checks to verify a runtime environment for the second programming language based on the presence of the signature.

17 Claims, 4 Drawing Sheets

(56) References Cited

U.S. PATENT DOCUMENTS

2013/0132947 A1* 5/2013 Falby ................ G06F 9/44505
718/1

OTHER PUBLICATIONS

William N. Sumner, et. al, Precise Calling Context Encoding, May 2010 ACM/IEEE 32nd International Conference on Software Engineering, Cape Town, 2010, pp. 525-534.

* cited by examiner

PERFORMANCE ACCELERATION IN MIXED-LANGUAGE APPLICATIONS

BACKGROUND

Technical Field

The present invention generally relates to optimizing mixed-language applications and, more particularly, to using a signature to indicate a transfer of control between a high-level language or assembly caller into another high-level language subprogram.

Description of the Related Art

Some applications run in a mixed environment, where code is written in different languages to perform the application's tasks. For example, the body of the program may be written in a low-level language such as assembly, while transaction application programs may be written in high-level languages such as COBOL or PL/I. In such an environment, the assembler program may repeatedly invoke the transaction programs. These calls cross a language boundary and may cause significant overhead in runtime processing.

When one program calls another, the called program can optimize its startup routines if the language environment is already in place. For example, if a first COBOL program calls a second COBOL program, the second COBOL program can verify that the program that called it was also written in COBOL and bypass its initialization. In contrast, if the first program were written in a different language, the COBOL program has no assurance that its language environment has been initialized. As a result, the called COBOL program will check for itself whether its environment has been initialized. If the COBOL program is called many times, these checks represent a needless waste of computing resources.

SUMMARY

A computer-implemented method for cross-language program execution includes setting a signature of a second programming language in a first program that is written in a first programming language. A second program that is written in the second programming language is called from the first program, such that the second program omits checks to verify a runtime environment for the second programming language based on the presence of the signature.

A computer-implemented method for cross-language program execution includes executing a dummy program that is written in a high-level second programming language to initialize a runtime environment for the second programming language. A signature of the second programming language is set in a low-level first program that is written in a first programming language. Setting the signature includes setting a stack frame field or other designated field to signify the transfer of control to the second programming language and setting one or more registers in the first program with information that follows a convention of the second programming language. A second program that is written in the second programming language is called from the first program, such that the second program omits checks to verify a runtime environment and other related processing for the second programming language based on the presence of the signature. A system for cross-language program execution includes a hardware processor and a memory, the hardware processor being configured to execute programs written in a first programming language and programs written in a second programming language. A first program is stored in the memory, written in the first programming language. The first program is configured to set a signature of the second programming language. A second program is stored in the memory, written in the second programming language. The second program omits checks to verify a runtime environment for the second programming language when the second program is called by the first program based on the presence of the signature.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention optimize the calling of a program written in a second language by a program written in a first language. Although the present embodiments are described with the first language specifically being a low-level language, such as assembly, and with the second language specifically being a high-level language, such as COBOL, but it should be understood that the present principles apply equally to cross-language program calls between programs written in two different languages.

To prevent the called program from performing redundant language environment checks, the present embodiments use a signature to indicate that the calling program is transferring control to a subprogram written in a second language. A dummy program in the second language is first run to provide basic environment initialization with a basic environment layer that is shared by all programs. Every time that the calling program calls a program written in the second language, the calling program uses a language identifier or signature to indicate a transfer to the second language. The calling program also sets appropriate registers to follow the convention expected by the called program during its initialization process. In particular, a designated register can be used to point to the subprogram's control block, if available. The language identifier or signature, together with the control block, provide sufficient information for the second language to perform only parts of the initialization that have not already occurred. In one exemplary embodiment, the signature can be put on the language stack. Other locations that are readily accessible by the called subprogram can also be used.

In this manner, the calling program signifies the transfer of control into the second language, thereby suppressing redundant environment checks by the called program. As a result of this optimization, the cross-language call can be made about as efficient as same-language program calls, resulting in a significant reduction of execution time as compared to un-optimized cross-language calls.

Figure 1:
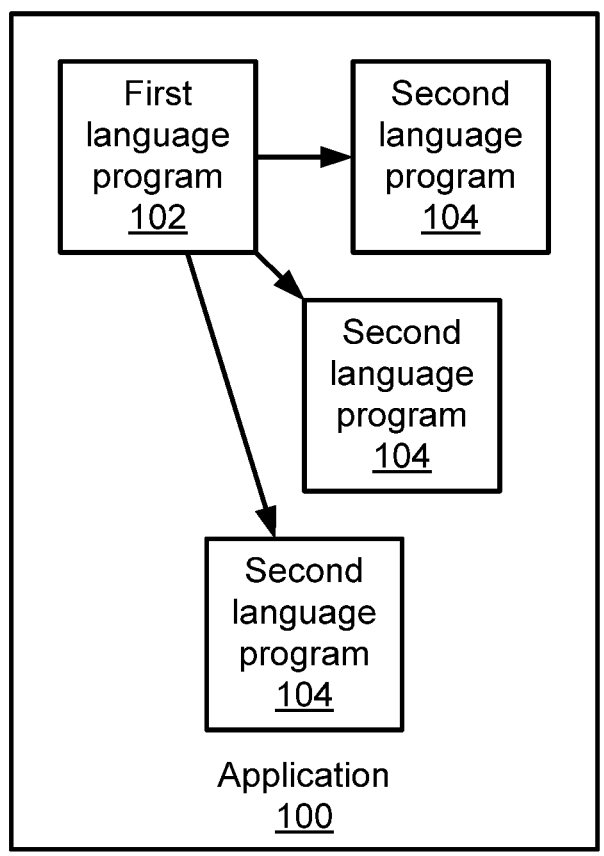
FIG. 1 is a block diagram of a multi-language application in accordance with the present embodiments.

Referring now to FIG. 1, a multi-language application 100 is shown. A core program 102 is written in a first language such as, e.g., a low-level language such as an assembly language tailored to the particular hardware architecture that runs the application 100. The first language program 102 calls a transactional program 104 written in a second language such as, e.g., a high-level language such as COBOL, PL/I, or C++. As the terms are used herein, a "low-level language" refers to a programming language that uses little to no abstraction, with commands mapping closely to instructions on a hardware processor, while a "high-level language" refers to a programming language that uses relatively strong abstraction from the machine-code instructions of the hardware processor.

The first language program 102 may call the second language program 104 many times over the course of the runtime of the application 100. In one specific example, where the application 100 handles banking transactions, the first language program 102 may be a core framework, while the second language program 104 handles the individual transactions.

Such an application 100 may involve many millions of calls to the second language program 104. As a result, any optimization in the execution of the second language program 104 is multiplied many times over. This is the case whether the first program is written in a low-level language or a high-level language—unless the second language program can verify that the program that called it is written in the same language, it will need to check to make sure the appropriate environment has been initialized.

Figure 2:
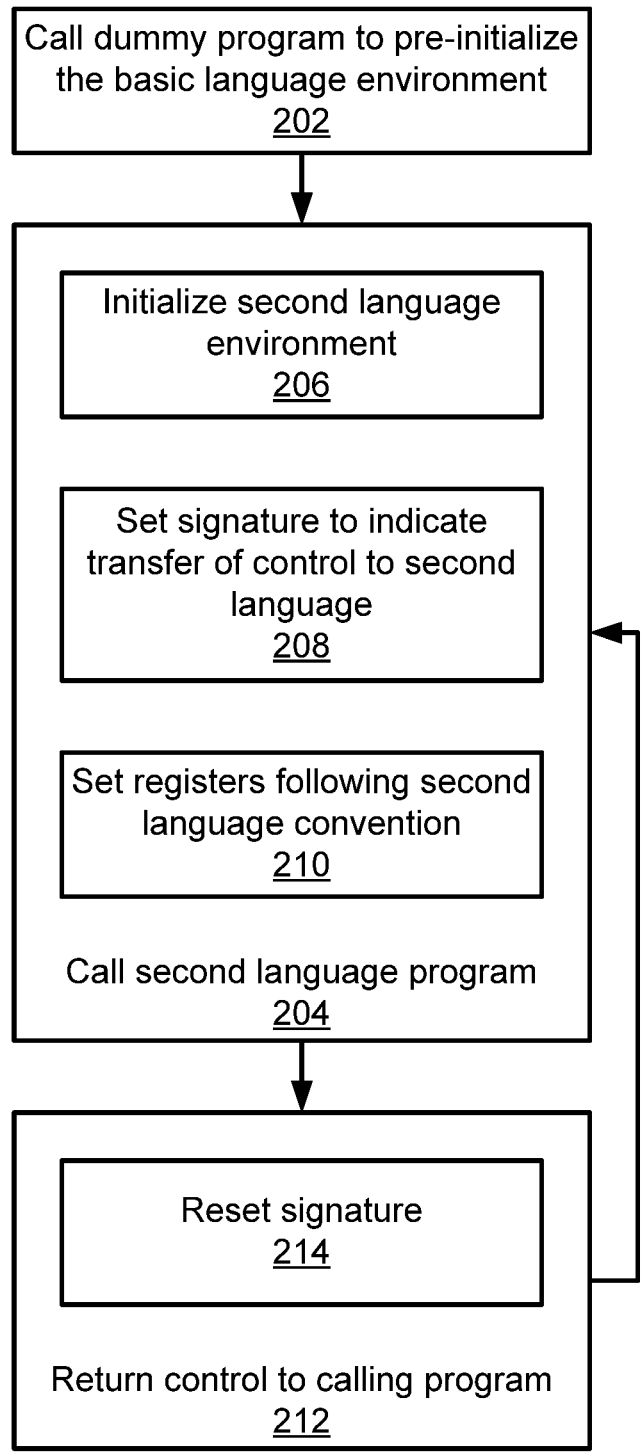
FIG. 2 is a block/flow diagram of executing a multi-language application in accordance with the present embodiments.

Referring now to FIG. 2, a method of signifying transfer of control to a second language is shown. Block 202 calls a dummy program in the second language. The purpose of the dummy program is to initialize elements of the language environment, so that subsequent calls to high-level languages will have the environment layer ready. This environment layer has indicators about the initialization status of individual high-level language libraries. Block 202 only need to be performed once during the runtime of the first language program 102.

The first language program 102 then calls a program written in the second language 104 in block 204. Calling the second program 204 includes initializing whatever elements of the second program language that are still needed in block 206. The first language program 102 sets a reserved field that designates the language of authorship in block 208. The reserved field can be, for example, in the language stack or in any other location that is readily accessible by the second language program 104. This reserved field is part of what is checked by programs in the second language to determine whether they need to perform environment checks and related processing. The first language program 102 therefore overwrites its own language identifier in its stack frame or other designated location with that of the second language. The language identifier itself may be a static value that is set in advance or, alternatively, may be set dynamically based on the language of the program to be called 104. One additional process performed by block 208 is to ensure that any exception handler does not use the stack frame identifier or other designated location to identify individual stack frames to resume processing. In one specific example, where the signature is put on the stack and where the language of the program being called 104 is COBOL, the stack frame language identifier may be set to a signature such as, e.g., 0x00123456, which the runtime uses to identify transfer of control to the subprogram.

In addition to setting the stack frame field in block 208, block 210 sets registers to provide needed information to the second language. These registers may refer to control blocks that are generated and maintained by the second-language runtime including, e.g., a program control block and a program global area. In one implementation that uses COBOL, the program control block is known as COBOL's load list entry and the program global area is known as the task global table. The first language program 102 therefore provides the control information that programs of the second language 104 need to operate, such that the called programs 104 have the needed information readily available.

After the second language program 104 completes its operation, control returns to the first program 102 in block 212. Block 214 resets the signature field of the first language program 102 to its original contents for future operations. The first language program in block 212 can then proceed on its own or issue another call to a program in the second language 104, repeating the processes of block 206.

By making the needed information available to the second language when calling programs 104 in that language, the runtime penalty of cross-language execution is minimized and approaches the runtime of purely native execution. Taking conventional cross-language execution as a baseline, native execution in a single language (where, e.g., a COBOL program calls another COBOL program) provides a significant optimization by omitting runtime checks and related processing by the called program. For example, in tests, native execution optimization has reduced the runtime by up to about 8%. The present embodiments replicate these improvements in cross-language execution, taking advantage of the single-language-like optimization that is achieved by letting the called program 104 skip its runtime checks. This is the case even for called programs 104 that themselves include mixed-language code—an embodiment which would result in significant execution times compared to the baseline without the optimization of the present embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
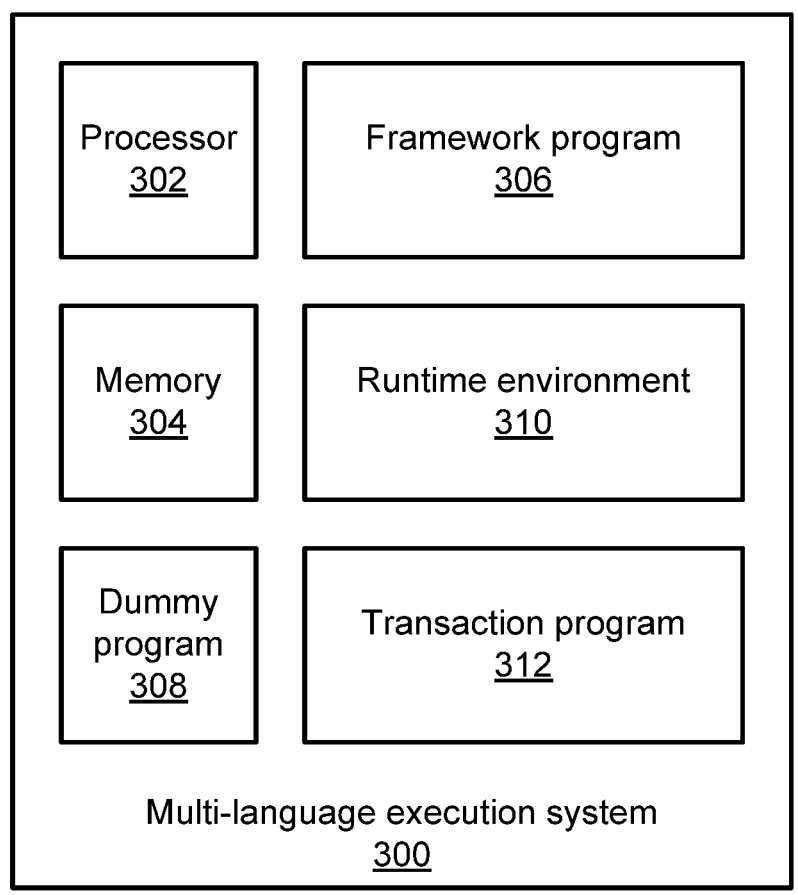
FIG. 3 is a block diagram of a multi-language execution system in accordance with the present embodiments.

Referring now to FIG. 3, a system 300 for execution of programs written in multiple languages is shown. The system 300 includes a hardware processor 302 and memory 304. It should be understood that the hardware processor 302 may be a single hardware component or may, alternatively, be multiple processors or multiple processing cores, located in a single location or geographically distributed. In one particular embodiment, the hardware processor 302 has one or more associated low-level programming languages, for example an assembly language.

A framework program 306 is written in a first programming language. It is specifically contemplated that the framework program 306 may be written in a low-level assembly language associated with the hardware processor 302, but it should be understood that the framework program 306 may be written in any appropriate low-level or high-level programming language. The framework program 306 executes a dummy program 308 that is written in a second, high-level programming language. The framework program 306 establishes a runtime environment 310 for the second programming language. In an alternative embodiment, the dummy program 308 may run first to establish the runtime environment 310 and may then itself call the framework program 306.

After the runtime environment 310 has been initialized, the framework program 306 calls a transaction program 312. The transaction program 312 is written in the second programming language and needs access to the runtime environment 310. To prevent the transaction program 312 from performing checks to ensure that the runtime environment 310 is in place, the framework program 306 mimics the contextual information and language identifier of the second programming language, taking information about the runtime environment 310 that is provided by the dummy program 308 to match the conventions expected by the transaction program 312. The runtime checks performed by the transaction program 312 can thereby be suppressed, optimizing the execution of the transaction program 312 and improving its runtime performance. When control returns to the framework program 306, the framework program 306 ceases mimicking the second programming language.

Figure 4:
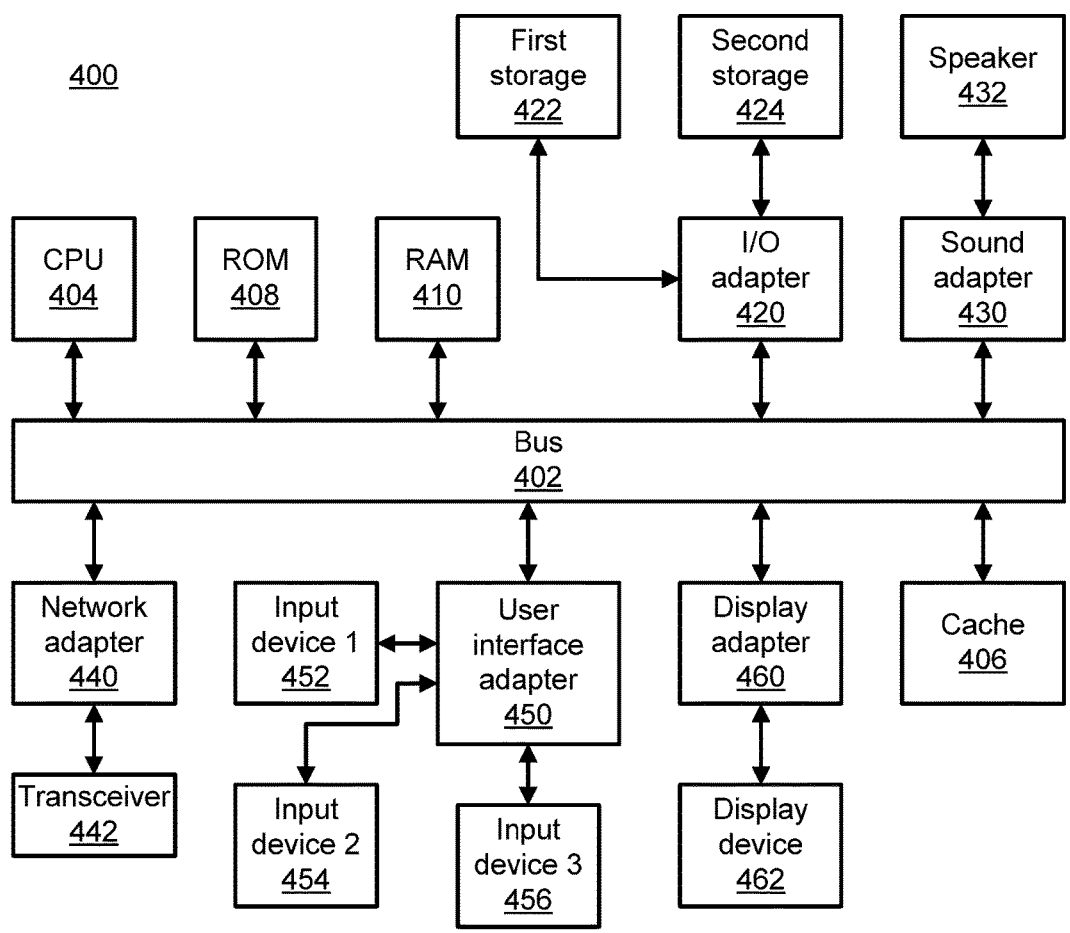
FIG. 4 is a block diagram of a processing system in accordance with the present embodiments.

Referring now to FIG. 4, an exemplary processing system 400 is shown which may represent the multi-language execution system 300. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for cross-language program execution, comprising:
   setting a signature of a second programming language in a first program that is written in a first programming language by setting a stack frame field to match a language identifier of the second language; and
   calling a second program that is written in the second programming language from the first program, such that the second program omits checks to verify a runtime environment for the second programming language based on the presence of the signature.

2. The computer-implemented method of claim 1, further comprising executing a program that is written in the second programming language to initialize a runtime environment for the second programming language before calling the second program.

3. The computer-implemented method of claim 1, further comprising resetting the stack frame field to match a language identifier of the first programming language when the second program completes execution.

4. The computer-implemented method of claim 1, further comprising preventing an exception handler from using the stack frame field to identify individual stack frames to resume processing when the signature is set.

5. The computer-implemented method of claim 1, wherein setting a signature of the second programming language in the first program comprises setting one or more registers in the first program with information that follows a convention of the second programming language.

6. The computer-implemented method of claim 5, wherein the information that follows the convention of the second programming language comprises a program control block and a program global area.

7. The computer-implemented method of claim 1, wherein the first programming language is a low-level programming language and wherein the second programming language is a high-level programming language.

8. The computer-implemented method of claim 7, wherein the first programming language is an assembly language and wherein the second programming language is selected from the group consisting of COBOL, PL/I, and C++.

9. The computer-implemented method of claim 1, wherein calling the second program from the first program is repeated once for each of a plurality of transactions.

10. A non-transitory computer readable storage medium comprising a computer readable program for cross-language program execution, wherein the computer readable program when executed on a computer causes the computer to perform the steps of:
setting a signature of a second programming language in a first program that is written in a first programming language by setting a stack frame field to match a language identifier of the second language; and
calling a second program that is written in the second programming language from the first program, such that the second program omits checks to verify a runtime environment for the second programming language based on the presence of the signature.

11. A system for cross-language program execution, comprising:
a hardware processor configured to execute programs written in a first programming language and programs written in a second programming language;
a memory;
a first program stored in the memory, written in the first programming language, said first program being configured to set a signature of a transfer of control to the second programming language by setting a stack frame field to match a language identifier of the second language; and
a second program stored in the memory, written in the second programming language, wherein the second program omits checks to verify a runtime environment for the second programming language when the second program is called by the first program based on the presence of the signature.

12. The system of claim 11, further comprising a program stored in the memory, written in the second programming language, wherein the dummy program is configured to initialize a runtime environment for the second programming language before the second program is called.

13. The system of claim 11, wherein the first program is further configured to reset the stack frame field to match a language identifier of the first programming language when the second program completes execution.

14. The system of claim 11, wherein the first program is further configured to set one or more registers in the first program with information that follows a convention of the second programming language.

15. The system of claim 14, wherein the information that follows the convention of the second programming language comprises a program control block and a program global area.

16. The system of claim 11, wherein the first programming language is a low-level programming language and wherein the second programming language is a high-level programming language.

17. The system of claim 11, wherein the first program is configured to repeat a call to the second program once for each of a plurality of transaction.

* * * * *